(12) United States Patent
Mischler et al.

(10) Patent No.: US 6,250,203 B1
(45) Date of Patent: Jun. 26, 2001

(54) OPERATING DEVICE FOR MOTOR VEHICLES WITH INTEGRATED POSITION DETECTION

(75) Inventors: Manfred Mischler, Troy; Rüdiger Herbst, Rochester, both of MI (US)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/325,914

(22) Filed: Jun. 4, 1999

(30) Foreign Application Priority Data

Jun. 4, 1998 (DE) ................................................ 198 24 940

(51) Int. Cl.[7] .................................................. F01B 25/26
(52) U.S. Cl. ................................................................ 92/5 R
(58) Field of Search ................................................. 92/5 R

(56) References Cited

U.S. PATENT DOCUMENTS

| 4,140,045 | * | 2/1979 | Hardwick et al. | ...................... 92/5 R |
| 4,742,794 | * | 5/1988 | agstrom | ................................ 92/5 R X |
| 5,031,504 | * | 7/1991 | Gratzmuller | ......................... 92/5 R X |
| 5,299,489 | * | 4/1994 | Obrecht et al. | ........................ 92/5 R |
| 5,758,758 | * | 6/1998 | Friedrich | ............................. 92/5 R X |
| 5,899,225 | * | 5/1999 | Yokogi | ................................. 92/5 R X |

FOREIGN PATENT DOCUMENTS

| 1601763 | * | 3/1970 | (DE) | ........................................ 92/5 R |
| 41 20 643 | | 12/1992 | (DE) . | |

\* cited by examiner

*Primary Examiner*—John E. Ryznic
(74) *Attorney, Agent, or Firm*—Cohen, Pontani, Liebermann & Pavane

(57) ABSTRACT

Operating device for motor vehicles, in particular having an output cylinder and/or an input cylinder connected hydraulically to the latter. The operating device includes a housing, a cylinder arranged in the housing and a piston which can be moved back and forth in the cylinder between a rest dead point and an operating dead point. The position of the piston in the cylinder is rendered detectable by signals from at least one switch. As many switches as desired are integrated into an input cylinder, thus rendering it possible to interrogate the position of the piston via a switch unit either for a display or for data reconciliation.

18 Claims, 5 Drawing Sheets

OPERATING DEVICE FOR MOTOR VEHICLES WITH INTEGRATED POSITION DETECTION

BACKGROUND OF THE INVENTION

1. Field of the Invention

The invention relates to an operating device for motor vehicles.

2. Discussion of the Prior Art

Friction clutches are subjected to constant wear which makes it necessary to replace the clutch disks at the right time, it generally being desirable to render the wear visible without dismantling the entire clutch. Lever-operated clutches, in which the lever is mechanically joined to the coupling disk, permit direct measurement of the wear at the lever. In the case of actuating a clutch via a hydraulic cylinder, it is no longer the lever position for clutch operation but the position of the hydraulic piston which is a measure of the rate of wear on the clutch disk.

A device is described in German reference DE 41 20 643 A1 which displays the wear by means of an electric contact on the hydraulic cylinder, and thus displays the position of the hydraulic piston. The display is installed in the form of a warning lamp which informs the user of the motor vehicle about the state of the clutch.

SUMMARY OF THE INVENTION

The present invention proposes, by contrast, not only to install an end position for displaying a limiting value, but also to track the piston position at the start and at the end of the operation and to evaluate this via an electronic system. Moreover, it is proposed in addition to provide a plurality of intermediate positions in the hydraulic cylinder through which the hydraulic piston passes with a contact element, and to connect the contact element to a switch. The switches are connected to a switch unit which picks up the pulses of the switches and relays then to a display via an electronic computer. Such an integrated positional interrogation makes it possible to provide information not only on the state of the clutch but also on the correct functioning of the hydraulic system. In particular, the initial position of the hydraulic piston and the end position thereof are particularly desirable parameters. It is possible for an intermediate position of the hydraulic piston in the cylinder to provide information, depending on the position of said piston with reference to the piston travel, on the function features occurring during operation of the vehicle clutch.

The object of the invention which emerges from the possibilities outlined is to integrate into an input and/or output cylinder positional interrogation for a piston with regard to its two end positions, it being desirable if the position can additionally be interrogated at at least one position between the two end positions.

Pursuant to this object, and others which will become apparent hereafter, one aspect of the present invention resides in an operating device having a housing, a cylinder arranged in the housing, a piston arranged in the cylinder so as to be movable back and forth between a rest dead point and an operating dead point, and switch means for outputting signals which indicate a position of the piston and the cylinder, the switch means including at least one switch.

In another embodiment of the invention the switch is arranged in either the housing or a guide sleeve which is arranged in the housing for the purpose of guiding the piston.

In still another embodiment of the invention the switch means includes a plurality of switches and contact elements arranged so that the switches and contact elements relay signals to a switch unit for detecting different positions of the piston.

Electronic computer means are provided in yet another embodiment of the invention for conditioning signals relayed to the switch unit by the switches and for passing the signals to a display.

The plurality of drawings and sketches illustrates the proposed integrated positional interrogation for the piston in an input and/or output cylinder.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
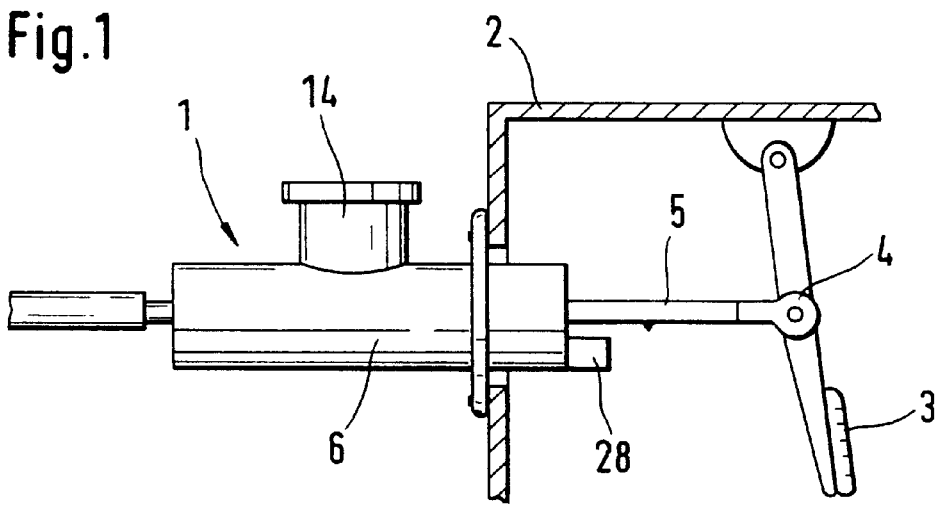
FIG. 1 shows an input cylinder, connected to a clutch pedal, having an external electrical switch as position detector for a piston, as is known from the prior art.

FIG. 1 denotes an input cylinder for an operating device for motor vehicles, said cylinder 1 is fastened to a body part 2 of the motor vehicle. A piston 6 is connected to a clutch pedal 3 via a piston rod 5 and via a fastening part 4. In accordance with FIG. 1, the input cylinder 1 has a compensating vessel 14 and an external switch unit 28 which is electrically connected to a display device, which can be used to display the pedal position with regard to its end positions in accordance with the prior art.

Figure 2:
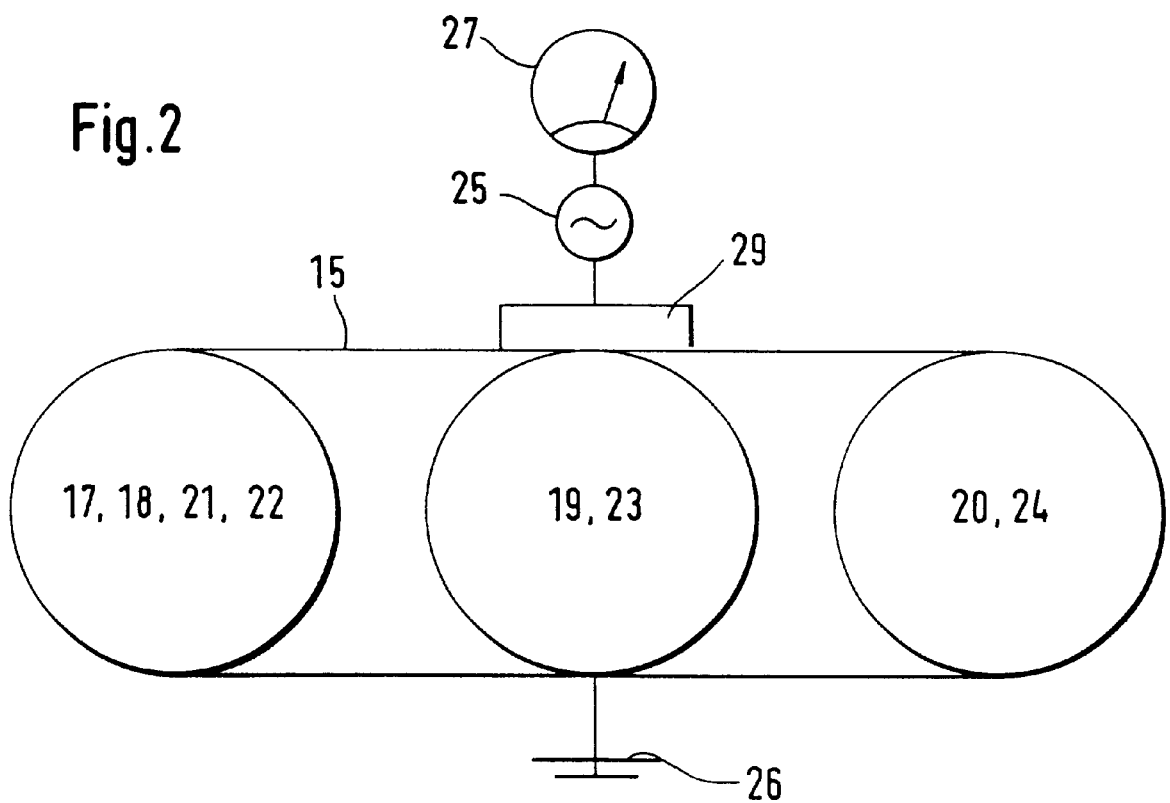
FIG. 2 shows a switch unit having a display which is connected to switches in the input cylinder.

Represented in FIG. 2 as the proposal of the invention is a switch unit 15 which is arranged between a display 27 and the input cylinder 1. It is possible to use switches 17, 18, 19, 20, 21, 22, 23 and 24 to interrogate the position of the piston 6 in the input cylinder 1. The switch unit 15 can be connected to an electronic computer 29 which, in accordance with known criteria not set forth in detail here, processes the signals of the switches 17, 18, 19, 20, 21, 22, 23 and 24 and feeds them to the display 27. 25 denotes a current source which supplies the switches 17, 18, 19, 20, 21, 22, 23 and 24, the display 27, the computer 29 and the switch unit 15 with current. 26 is to be understood as the frame which produces the circuit termination (ground) relative to the current source.

Figure 3:
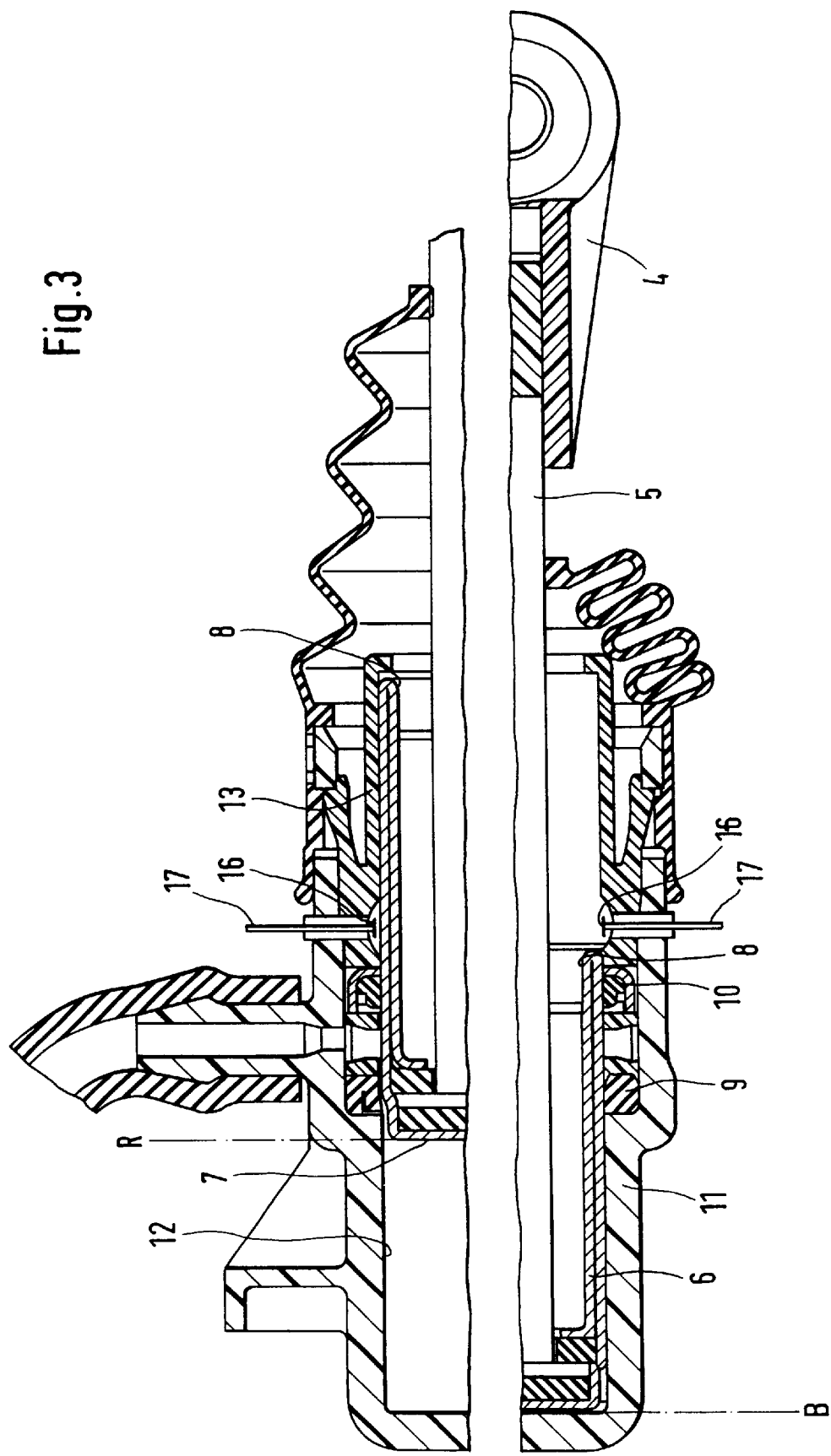
FIG. 3 shows the input cylinder with a switch in a guide sleeve for outputting a signal for an operating dead point.

FIG. 3 shows the switch 17 with a contact element 16 which is electrically connected to the switch unit 15 and is to be understood in this case as a closing device of a circuit. The switch 17 comprises two electric leads with two contact elements 16 which can be short circuited by the piston 6, which consists of current-conducting material. The switch 17 is situated in the pressure-free zone behind a primary seal 9 and a secondary seal 10, which seal the cylinder space in a housing 11 of a cylinder 12 of the input cylinder 1 with respect to the atmosphere. In the direction of the cylinder space, the piston 6 has a piston head 7 which occupies a rest dead point R in the rest position of the piston 6, and thus with the clutch engaged. If the clutch is released, and the piston 6 is pushed into the position of an operating dead point B in the housing 11, the piston 6 sweeps with its lateral surface over the contact element 16 of the switch 17 until a rod-side end 8 of the piston 6 opens the circuit and thus transmits a signal via the switch 17 of the switch unit 15 as an item of positional information for the display 27 for the piston 6. Thus, the switch 17 is controlled from the rod-side end 8 of the piston 6, and this requires that the switch 17 must be arranged in a guide sleeve 13.

Figure 5:
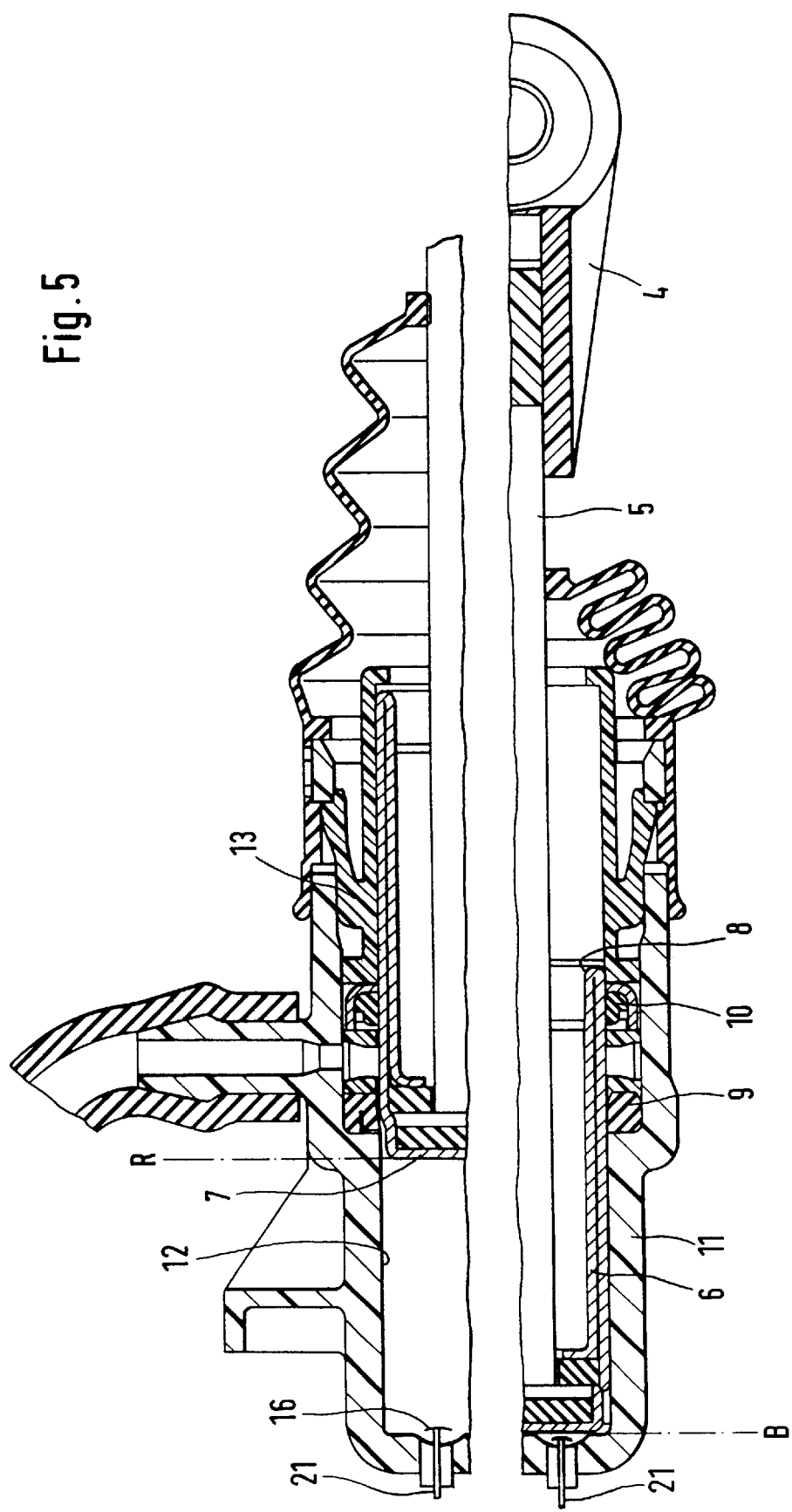
FIG. 5 shows an input cylinder in accordance with FIG. 3 with a switch in a cylinder of the input cylinder for outputting signals for the operating dead point.

Just as the arrangement of the switch 17 supplies a signal to the display 27 via the switch unit 15, in accordance with FIG. 5 such a signal can also be produced from a switch 21 which is arranged in the housing 11 of the cylinder 12 with respect to the piston head 7, and is caused by the latter to close a circuit via the contact element 16. The switch 21 is connected to the display 27 in the switch unit 15 via a circuit which can be closed when the operating dead point B of the piston 6 is reached.

Figure 4:
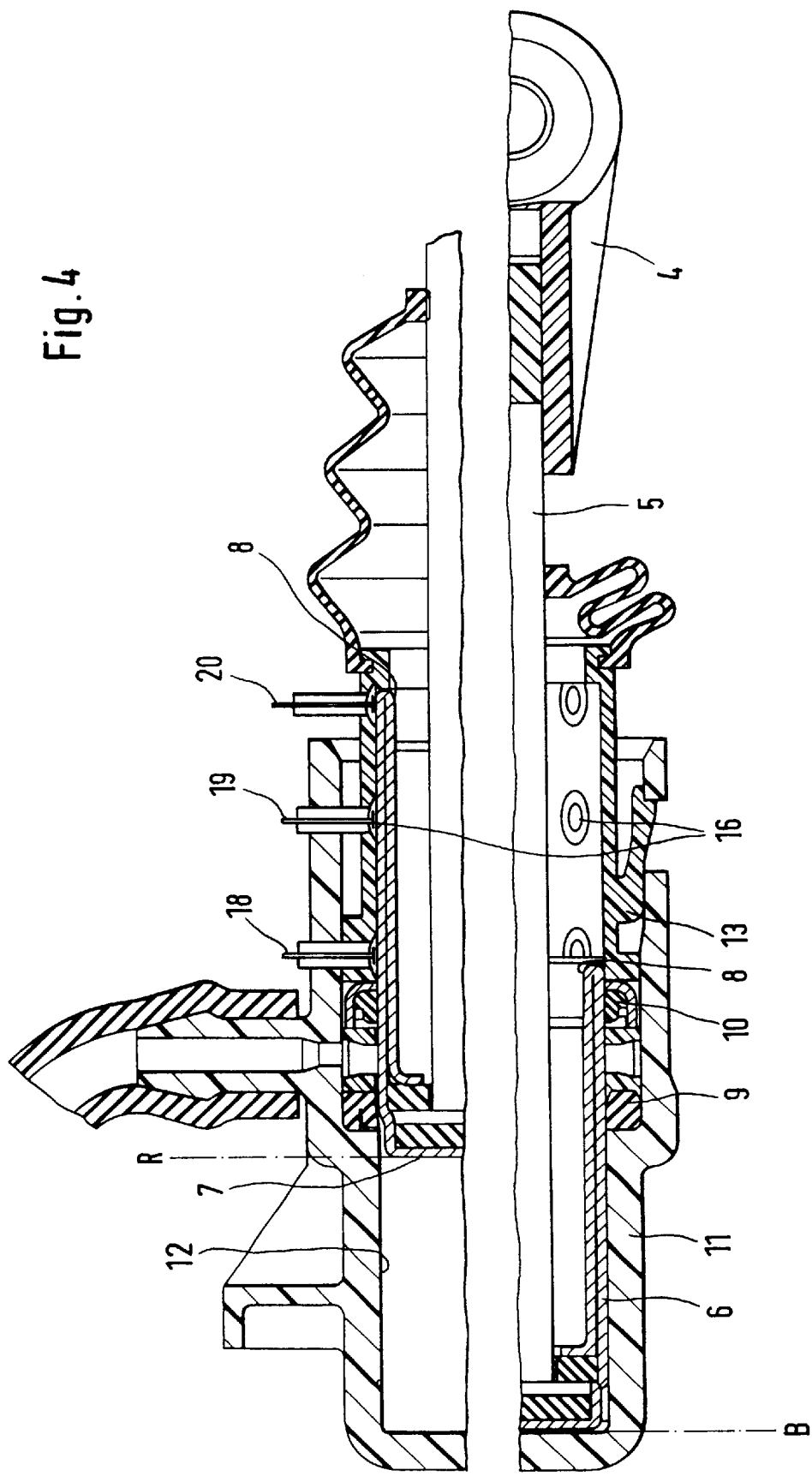
FIG. 4 shows an input cylinder in accordance with FIG. 3 with the plurality of switches in the guide sleeve for outputting signals for the operating dead center, a rest dead point and for an intermediate position of the piston.

It may be seen from FIG. 4 that it is possible to arrange in the guide sleeve 13 a plurality of switches 18, 19, 20 which supply the varying position of the piston 6 in the cylinder 12 to the switch unit 15 via signals. On its path from the rest dead point R up to the operating dead point B, in this case the piston 6 releases three switches 18, 19, 20, whose signals can be compared in the switch unit 15 with signals from a position-determining device of the clutch, for example. It is advantageous that the evaluation of all the data in the switch unit 15 consists in a visualization in the display 27 with a warning system and/or in data reconciliation between two systems, specifically that described here and signals relating to the position of the clutch as a permanent control instrument for operating the clutch.

Fitting the switches 18, 19, 20 in the guide sleeve 13, which for the most part comprises plastic, has both the advantage of ease of fitting, and the advantage that at this point in the input cylinder 1 pressure does not prevail, not is there any hydraulic fluid.

Figure 6:
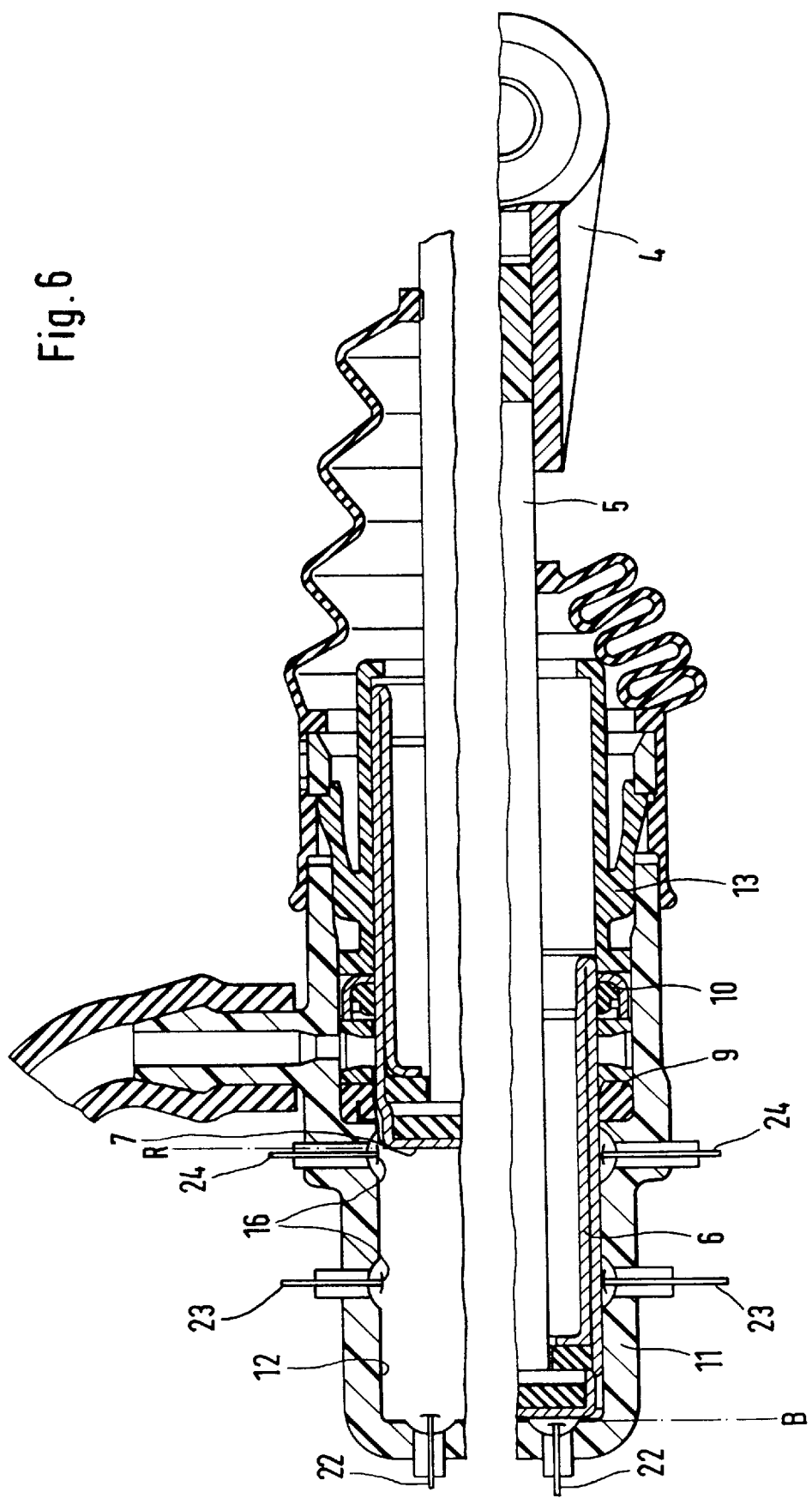
FIG. 6 shows the input cylinder in accordance with FIG. 4 with a plurality of switches in the cylinder for outputting signals relating to the rest dead point, the operating dead point and an intermediate position of the piston in the cylinder.

As an alternative to the circuit arrangement in FIG. 4, FIG. 6 proposes fitting switches 22, 23, 24 in the housing 11 along the cylinder 12, which are positioned in such a way that the rest dead point R, the operating dead point B and also intermediate positions of the piston 6 can be signaled to the switch unit 15. The piston 6 sweeps with its current-conducting generatrix over the various contact elements 16 of the switches 24, 23 and possibly also 22, the circuits being closed for the purpose of forming signals. The switch 22 is closed by the piston head 7 of the piston 6 since, in this special case, the piston 6 has, on the outer circumference of the piston head 7, a shape which prevents a radially arranged contact element 16 from being swept over. The contact elements 16 all project into the pressure space of the cylinder 12, for which reason the mobility is restricted and it is necessary to pay greater attention to the tightness of the cylinder space.

The subject-matter of the invention described above relates to the principle of mechanical closure of circuits by metallically conducting objects for generating electric signals. Mention should be made of the fact that use may also be made of the principle of generating and transmitting signals by sensor, and it is even simpler with regard to the fitting of switches 17, 24 since there is no need to arrange two contact elements 16. Rather, one is sufficient on the assumption that the piston 6 serves as a frame. The sensors can be arranged on the switch unit 15 individually or as integral components of the computer 29. The result will be the same as that from the circuit arrangement described above.

The invention is not limited by the embodiments described above which are presented as examples only but can be modified in various ways within the scope of protection defined by the appended patent claims.

We claim:

1. An operating device for a motor vehicle, comprising:
a housing;
a cylinder arranged in the housing;
a piston arranged in the cylinder so as to be movable back and forth between a rest dead point and an operating dead point;
switch means for outputting signals which indicate a position of the piston in the cylinder, the switch means including at least one switch; and
a guide sleeve arranged in the housing so as to guide the piston, the at least one switch being arranged in the guide sleeve.

2. An operating device as defined in claim 1, wherein the switch means includes contact elements arranged to supply electric signals by contact with the piston.

3. An operating device as defined in claim 1, wherein the switching means includes a switch unit to which the at least one switch is connected.

4. An operating device as defined in claim 3, wherein the switch means includes a plurality of switches and contact elements, the switches being operatively arranged in the housing so that the contact elements relay signals to the switch unit for detecting different positions of the piston.

5. An operating device as defined in claim 3, and further comprising a display and electronic computer means for conditioning signal relayed to the switch unit by the at least one switch and passing the signal to the display.

6. An operating device as defined in claim 1, wherein the switch is operatively arranged to signal the operating dead point of the piston.

7. An operating device for a motor vehicle, comprising:
a housing;
a cylinder arranged in the housing;
a piston arranged in the cylinder so as to be movable back and forth between a rest dead point and an operating dead point; and
switch means for outputting signals which indicate a position of the piston in the cylinder, the switch means including at least one switch, the switch means including contact elements arranged to supply electric signals by contact with the piston, the piston having a conducting metal surface and the contact elements being sliding-action contacts which can be connected to one another electrically by the conducting metal surface of the piston.

8. An operating device as defined in claim 7, wherein the at least one switch is arranged in the housing.

9. An operating device as defined in claim 7, and further comprising a guide sleeve arranged in the housing so as to guide the piston, the at least one switch being arranged in the guide sleeve.

10. An operating device as defined in claim 7, wherein the switching means includes a switch unit to which the at least one switch is connected.

11. An operating device as defined in claim 10, and further comprising a display and electronic computer means for conditioning a signal relayed to the switch unit by the at least one switch and passing the signal to the display.

12. An operating device as defined in claim 7, wherein the switch is operatively arranged to signal the operating dead point of the piston.

13. An operating device for a motor vehicle, comprising:

a housing;

a cylinder arranged in the housing;

a piston arranged in the cylinder so as to be movable back and forth between a rest dead point and an operating dead point; and switch means for outputting signals which indicate a position of the piston in the cylinder, the switch means including at least one switch, the switch means including contact elements arranged to supply electric signals by contact with the piston, areas of different contact resistance being arranged along the piston generatrix on a sliding track of at least one of the contact elements in order to continuously display a position of the piston in the cylinder.

14. An operating device as defined in claim 13, wherein the at least one switch is arranged in the housing.

15. An operating device as defined in claim 13, and further comprising a guide sleeve arranged in the housing so as to guide the piston, the at least one switch being arranged in the guide sleeve.

16. An operating device as defined in claim 13, wherein the switching means includes a switch unit to which the at least one switch is connected.

17. An operating device as defined in claim 16, and further comprising a display and electronic computer means for conditioning a signal relay to the switch unit by the at least one switch and passing the signal to the display.

18. An operating device as defined in claim 13, wherein the switch is operatively arranged to signal the operating dead point of the piston.

* * * * *